No. 629,067. Patented July 18, 1899.
D. DRYNAN & A. R. FULTON.
ROLLER BEARING.
(Application filed Jan. 21, 1899.)

(No Model.) 4 Sheets—Sheet 1.

Witnesses.
J. C. Lebret.
A. Witt.

Inventors.
David Drynan,
Angus R. Fulton,
By H. H. de Vos.
Attorney.

No. 629,067. Patented July 18, 1899.
D. DRYNAN & A. R. FULTON.
ROLLER BEARING.
(Application filed Jan. 21, 1899.)
(No Model.)
4 Sheets—Sheet 4.

Witnesses.
J. C. Lebret.
A. Witt.

Inventors.
David Drynan.
Angus R. Fulton.
By H. H. de Vos.
Attorney.

UNITED STATES PATENT OFFICE.

DAVID DRYNAN, OF GLASGOW, AND ANGUS ROBERTSON FULTON, OF MOTHERWELL, SCOTLAND.

ROLLER-BEARING.

SPECIFICATION forming part of Letters Patent No. 629,067, dated July 18, 1899.

Application filed January 21, 1899. Serial No. 702,927. (No model.)

*To all whom it may concern:*

Be it known that we, DAVID DRYNAN, of 12 Lorne Terrace, Maryhill, Glasgow, and ANGUS ROBERTSON FULTON, of Camp street, Motherwell, Scotland, have invented certain new and useful Improvements in Roller-Bearings, (which has been patented in Great Britain on the 22d day of June, 1898, No. 13,840,) of which the following is a specification.

This invention relates to improvements in roller-bearings, and has for its object the construction of such bearings so that they shall be more suitable for and better applicable to the axle-journals of railway rolling-stock and other vehicles, although our improvements are capable of advantageous application to roller-bearings for other purposes.

In roller-bearings as heretofore constructed for the axle-journals of rolling-stock the method of constructing or applying the cage for retaining or guiding the rollers has been such as to render difficult or impossible the application of such bearings to "bound" journals, or those formed between collars at each end, or as recesses in the shaft for the purpose of taking end thrust. Such construction or application of the cage also confines or binds the parts in such a manner as to prevent their ready accommodation the one to the other under the vibratory or other stresses set up by the motion of the vehicle.

The invention is illustrated by the accompanying drawings.

Figure 1:
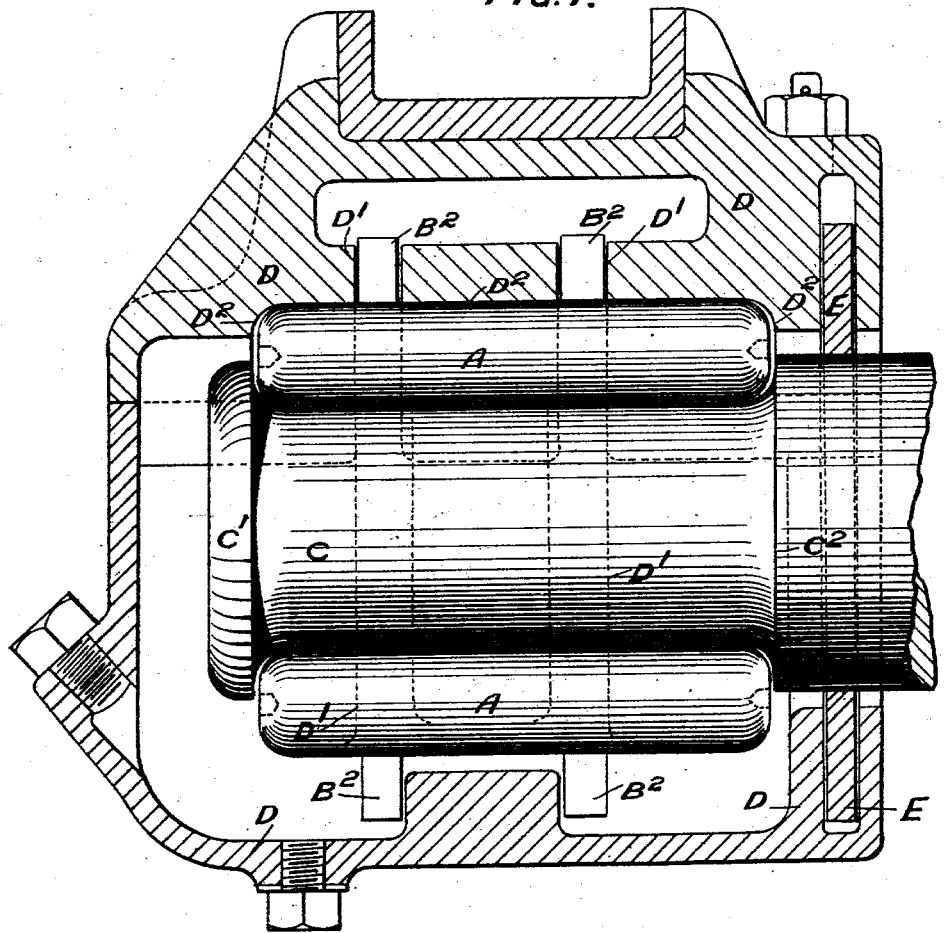
Figure 2:
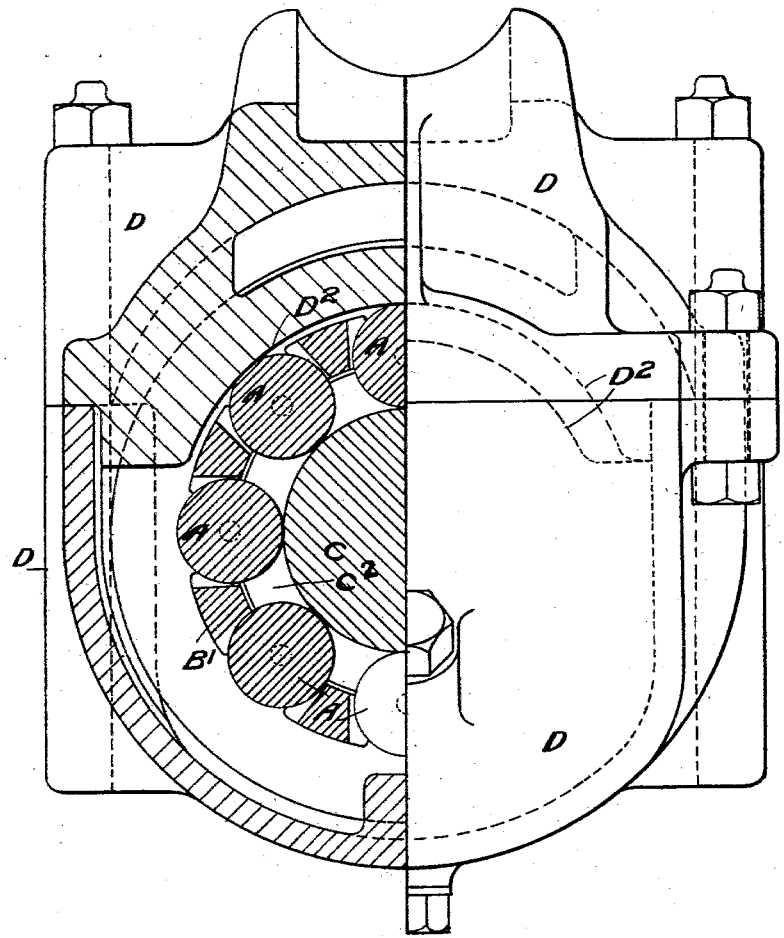
Figure 3:
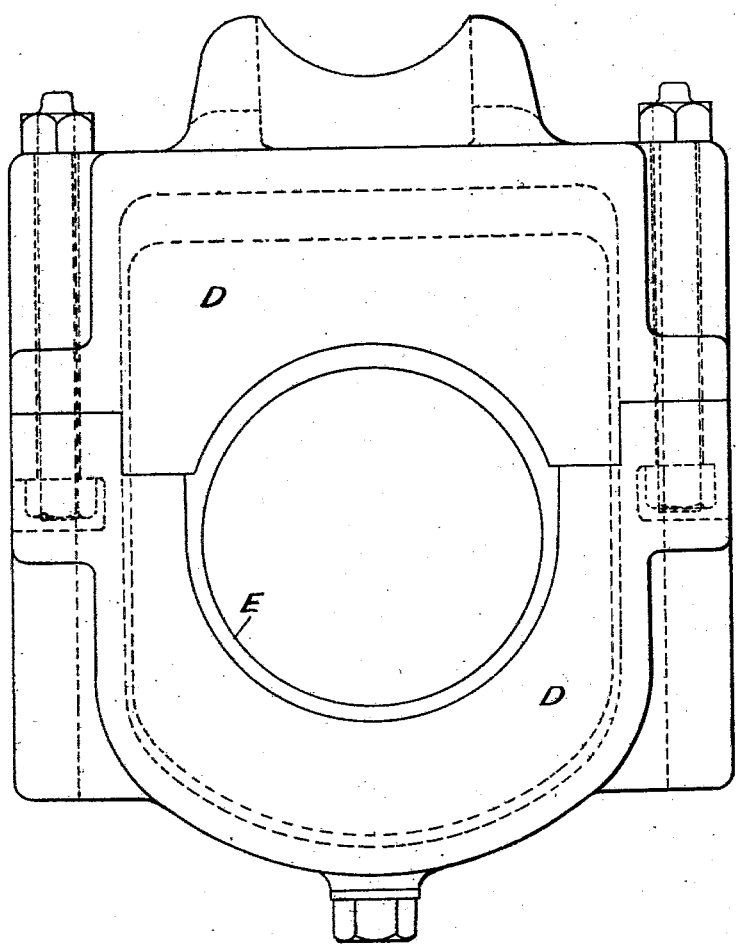
Figure 4:
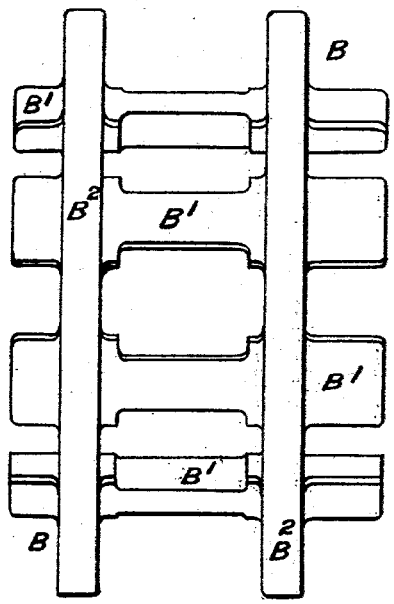
Figure 5:
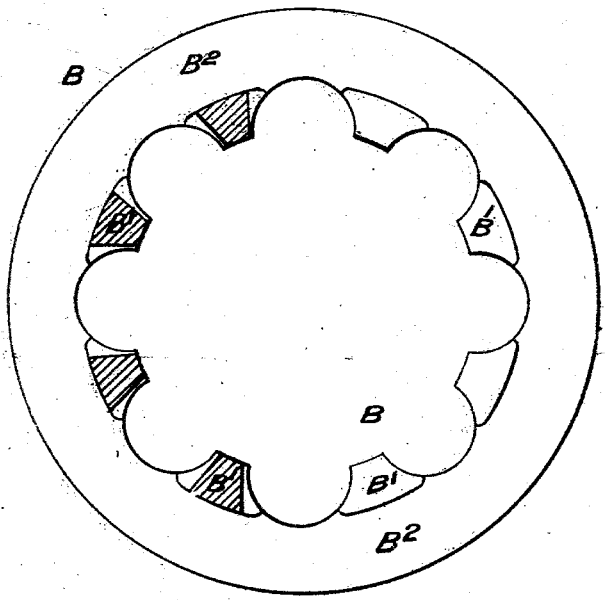

Figure 1 is a longitudinal vertical section of an axle-journal bearing constructed in accordance with our invention. Fig. 2 is a part transverse vertical section and part front elevation of the journal-bearing, and Fig. 3 is a back elevation of the same. Fig. 4 is a side elevation, and Fig. 5 a part transverse vertical section and part elevation, of a detail hereinafter referred to as the "cradle."

In carrying our invention into effect or practice under one modification, (illustrated by Figs. 1, 2, and 3,) which shows the bearing box or block made in two parts and applied to a bound journal, and with a view to obviating the defects previously mentioned and improving the construction and action of such bearings generally, we provide the rollers A with a cradle B (shown particularly at Figs. 4 and 5) in place of the "cage" hitherto used and before referred to, such cradle B embracing the rollers A circumferentially, so as to confine or retain them upon or within the journal C, as shown particularly at Fig. 2, but being open at the ends, so that of itself it will not prevent their movement in the direction of the shaft-axis. A series of bars B', forming part of the cradle B and running longitudinally in the direction of the shaft-axis, separate the rollers A and keep them parallel to such axis. Upon the periphery of the cradle B and formed integral therewith are rings or projecting circular collars $B^2$, and in the material of the axle box or block D for the bearing we form recesses or grooves D' to readily receive these, the said grooves D' being of such dimensions relatively to the collars $B^2$ as to permit of the free rotation of the latter within the former without appreciable lateral movement. In the material of the axle box or block D we also form a bed or channel $D^2$ for the rollers A, whose length in the direction of the shaft-axis is approximately that of such rollers and whose depth is sufficient to restrain tendency to their endlong movement under lateral stresses. In putting together the parts to form the bearing the cradle B is first pushed sufficiently far onto the journal C to permit of the simultaneous insertion of the rollers A into their respective compartments by their ends and into the recess between the collars C' $C^2$ upon the shaft C, which forms the journal. When all are in place, the cradle B is slipped fully on and over them and the axle C, with the cradle B and other appurtenances, placed within the axle box or block D, so that the annular rings $B^2$ upon the cradle B fit into their prepared grooves D' and the rollers into their rolling channel or bed $D^2$. When loaded and in motion, the axle C communicates the load through the rollers A by rolling friction to the said channel or bed $D^2$, the cradle B and contained rollers A also revolving, while endlong movement of the cradle B is prevented by the engagement of its collars $B^2$ with their grooves D', as described, and similar movement of the rollers by their confinement in their channel D². The collars B² on the cradle B do not bear except upon their sides, and the rollers A occupy much the same relative position to the journal C and axle box or block D as do the brasses in an ordinary bearing having a bound journal. In this modification the lower half of the box may be fitted with a tray filled with oil, so that it may perform the function of lubricating as well as guiding the rollers A, and a pad or bearing-piece of crescent or horseshoe section may be fitted, if desired, to the tray or lower half of the bearing D to aid in sustaining the rollers A during the lower portion of their revolution with the cradle B, such pad having its pressure regulated by a spring or its equivalent. With the aid of dust-proof collars E or their equivalent we make the bearing D dust-proof throughout.

In another modification of our invention, in which our improvements are applied to a solid axle-box, the bottom of such box is formed so that the axle, with the cradle and other parts or appurtenances in place, may be placed upward in the box, the opening so provided being afterward fitted with a plate or tray of such form that it may act as a part guide for the annular rings of the cradle and may serve as an oil-bath for the rollers, whose immersion therein as they revolve with the cradle will automatically lubricate the bearing.

Although we have described our improvements as they are applicable to the axle-journals of railway and other rolling-stock, we do not propose to confine them to such, as it will be obvious that with but unimportant modifications they are applicable to journals bound by collars generally.

Having now described the invention, what we claim, and desire to secure by Letters Patent, is—

1. In roller-bearings, the combination of a plurality of rollers and a cradle therefor composed of a series of longitudinal bars adapted to separate and preserve the parallelism of said rollers and of annular guide-rings binding said bars together and provided with orifices which permit of free end movement of said rollers, substantially as described.

2. In roller-bearings, the combination of an axle provided with collars to restrain end motion, rollers working on said axle and engaged at their ends by said collars, a cradle for said rollers adapted to separate and preserve said rollers in parallelism while permitting free end movement, and an axle-box provided with a channel adapted to receive said rollers and make end thrust thereon, substantially as described.

3. In roller-bearings, the combination of an axle provided with collars to restrain end motion, rollers working on said axle and engaged at their ends by said collars, a cradle for said rollers adapted to separate and preserve said rollers in parallelism while permitting free end movement, guide-rings on said cradle, and an axle-box provided with a channel for said rollers and with grooves for said rings, substantially as described.

In witness whereof we have hereunto set our hands in presence of two witnesses.

DAVID DRYNAN.
ANGUS ROBERTSON FULTON.

Witnesses:
WALLACE FAIRWEATHER,
JNO. ARMSTRONG, Jr.